(12) United States Patent
Penkert et al.

(10) Patent No.: US 10,802,191 B2
(45) Date of Patent: Oct. 13, 2020

(54) FERRULE FOR LIGHT GUIDE, ASSEMBLY WITH FERRULE, AND METHOD FOR PRODUCING SAME

(71) Applicant: SCHOTT AG, Mainz (DE)

(72) Inventors: Alexander Penkert, Eich (DE); Eric Senner, Hackenheim (DE); Andreas Dietrich, Guldental (DE); Stephan Schabacker, Frankfurt (DE)

(73) Assignee: SCHOTT AG, Mainz (DE)

( * ) Notice: Subject to any disclaimer, the term of this patent is extended or adjusted under 35 U.S.C. 154(b) by 223 days.

(21) Appl. No.: 15/910,418

(22) Filed: Mar. 2, 2018

(65) Prior Publication Data

US 2018/0252856 A1   Sep. 6, 2018

(30) Foreign Application Priority Data

Mar. 2, 2017   (DE) .................. 10 2017 104 398

(51) Int. Cl.
*F21V 8/00* (2006.01)
*G02B 6/38* (2006.01)
*G02B 6/42* (2006.01)

(52) U.S. Cl.
CPC ........... *G02B 6/0006* (2013.01); *G02B 6/001* (2013.01); *G02B 6/3818* (2013.01);
(Continued)

(58) Field of Classification Search
CPC .. G02B 6/00006; G02B 6/001; G02B 6/0013; G02B 6/0005; G02B 6/4253;
(Continued)

(56) References Cited

U.S. PATENT DOCUMENTS 5,375,183 A   12/1994   Edwards
6,152,578 A   11/2000   Hoffman
(Continued)

FOREIGN PATENT DOCUMENTS

AT   507162   6/2010
CN   2042567   8/1989
(Continued)

OTHER PUBLICATIONS

Habte, "Enhancing pixelated fast-neutron block detector performance using a slotted light guide", 2008 IEEE Nuclear Science Symposium Conference Record, 3128-3132, 10.1109/NSSMIC.2008.4775016, abstract.
(Continued)

*Primary Examiner* — Karabi Guharay
(74) *Attorney, Agent, or Firm* — Ohlandt, Greeley, Ruggiero & Perle, L.L.P.

(57) ABSTRACT

A termination for a light guide is provided that, on the one hand, allows connection of the light guide to a light source in a simple and reliable manner and, on the other hand, blocks light components that are not guided in the light guide. For this purpose, a ferrule is provided for terminating a light guide. The ferrule includes a transparent plastic part and an opaque light-blocking plastic part that are connected to each other to define a channel. The transparent plastic part has a light entry end that receives an end of the light guide. The channel has at least a portion that extends within the transparent plastic part and at least a portion that extends within the opaque plastic part. The has a collar surrounding the channel and has an outer diameter that is greater than a maximum outer diameter of the transparent plastic part.

18 Claims, 5 Drawing Sheets

(52) U.S. Cl.
CPC ......... *G02B 6/3849* (2013.01); *G02B 6/3855* (2013.01); *G02B 6/3865* (2013.01); *G02B 6/4248* (2013.01); *G02B 6/4253* (2013.01)

(58) Field of Classification Search
CPC .. G02B 6/3865; G02B 6/3855; G02B 6/3818; G02B 6/4248; G02B 6/3849
USPC .......................................................... 385/79
See application file for complete search history.

(56) References Cited

U.S. PATENT DOCUMENTS

| | | | |
|---|---|---|---|
| 6,554,485 B1 * | 4/2003 | Beatty | G02B 6/3849 385/70 |
| 2004/0146250 A1 | 7/2004 | Wakabayashi | |
| 2008/0075406 A1 * | 3/2008 | Kadomi | G02B 6/262 385/79 |
| 2011/0182552 A1 | 7/2011 | Russert | |
| 2013/0177280 A1 * | 7/2013 | Nielson | G02B 6/36 385/79 |
| 2014/0093212 A1 | 4/2014 | Ott | |
| 2016/0313486 A1 | 10/2016 | Woelfing | |

FOREIGN PATENT DOCUMENTS

| | | |
|---|---|---|
| CN | 1291269 | 4/2001 |
| CN | 203797569 | 8/2014 |
| CN | 105121947 | 12/2015 |
| DE | 10352599 | 6/2004 |
| DE | 102008044938 | 3/2010 |
| EP | 3086027 | 10/2016 |

OTHER PUBLICATIONS

"Principle and application of light guide lighting technology", CREAT LIVING, Issue 12, China Academic Journal Electronic Publishing House, http://www.cnki.net., with English translation.

* cited by examiner

FERRULE FOR LIGHT GUIDE, ASSEMBLY WITH FERRULE, AND METHOD FOR PRODUCING SAME

CROSS REFERENCE TO RELATED APPLICATIONS

This application claims benefit under 35 U.S.C. § 119(a) of German Application No. 10 2017 104 398.5, filed Mar. 2, 2017, the entire contents of which are incorporated herein by reference.

BACKGROUND

1. Field of the Invention

The invention generally relates to a ferrule for terminating a light guide. More particularly, the invention relates to a ferrule which is especially adapted to block stray light.

2. Description of Related Art

EP 3 086 027 A1 describes a lighting device with a side-emitting fiber bundle. The fiber bundle is inserted in a sleeve that has an extension which is effective as a light mixer and which has an end face into which the light from a light source is injected. The sleeve has an opening for the fiber bundle at its front end.

Furthermore, DE 10 2008 044 938 A1 describes a method for terminating light-guiding fiber bundles, in which an adhesive is filled into a sleeve, the adhesive having a refractive index that is greater than the refractive index of the sleeve. Then, the fiber bundle is introduced into the sleeve and fixed by the adhesive.

In both of the aforementioned documents, the sleeve is made of a transparent plastic material. This is advantageous, inter alia, to facilitate the injection of light at the fiber end.

However, in particular when injecting into a fiber bundle, it may happen that portions of the light introduced into the injection end are not forwarded within the fibers, but within the adhesive and within the transparent plastic material of the sleeve to emerge as stray light at the other end of the sleeve. Such stray light may be irritating, especially in the case of lighting devices with side-emitting optical fibers, since a light-blocking sheathing is missing here.

SUMMARY

Given the above, the invention is based on the object to provide a termination of a light guide, which on the one hand allows to connect the light guide to a light source in a simple and reliable manner, and on the other hand effectively blocks light components that are not guided in the light guide.

Accordingly, the invention provides a ferrule for terminating a light guide, comprising a transparent plastic part, and an opaque light-blocking plastic part, wherein the two plastic parts are connected to each other, and wherein the transparent plastic part has a light entry end, and wherein a channel is provided extending towards the light entry end to receive the end of a light guide, wherein at least a portion of the channel extends in the transparent plastic part, wherein the two plastic parts overlap axially with respect to the channel along a longitudinal portion, and wherein the opaque plastic part has a collar which surrounds the channel and has an outer diameter that is greater than the maximum outer diameter of the transparent plastic part. The collar may also be referred to as a flange or skirt. Since the diameter of the collar of the opaque plastic part is greater than the maximum diameter of the transparent plastic part, light leaking axially from the transparent plastic part is blocked.

Thus, a lighting assembly with a light guide can be provided, in which the light guide is a side-emitting light guide, so that light injected at one end of the light guide in the operating state thereof is continuously scattered out along a lighting portion, so that the lighting portion forms a linear light source, and wherein this end of the light guide is equipped with a ferrule according to the invention.

The light-blocking effect can be further enhanced if the two plastic parts overlap axially along a longitudinal portion such that the opaque plastic part surrounds the transparent plastic part. Axially herein refers to the axial direction of the channel, i.e. the longitudinal extension thereof.

In particular, it is intended to connect the plastic parts by a material bond, i.e. so as to directly adhere to each other. Such a material bond may be created by injection molding one of the plastic parts onto the other plastic part in a plastic injection molding process. Particularly preferably, the opaque plastic part is injection molded onto the transparent plastic part. A connection may also be achieved by a form-fitting interengagement or may be supported by a form-fitting interengagement.

The invention will now be explained in more detail with reference to the figures.

DETAILED DESCRIPTION

Figure 1:
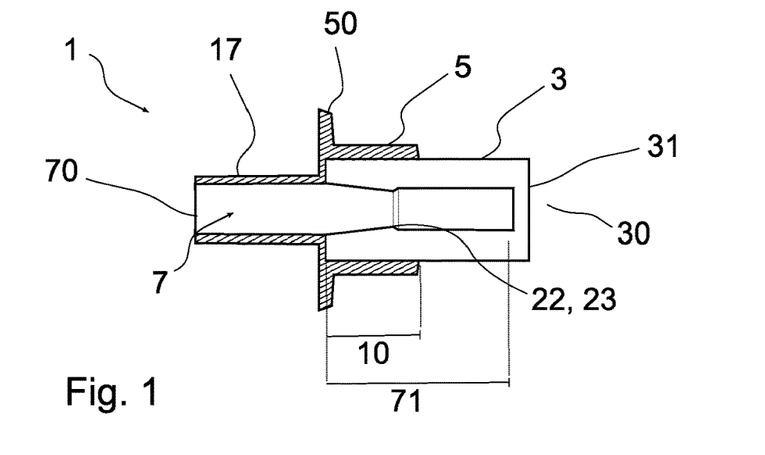
FIG. 1 is a schematic cross-sectional view through a ferrule.

FIG. 1 is a cross-sectional view showing an exemplary embodiment of a ferrule 1 according to the invention. Ferrule 1 for terminating a light guide is made of plastic material, in particular of thermoplastic material which allows cost-effective fabrication by injection molding. The ferrule is composed of two parts, namely a transparent plastic part 3 and an opaque light-blocking plastic part 5. Optionally, other parts may be comprised, such as a third plastic part.

The two plastic parts 3, 5 are connected to each other. In particular a direct material bond is envisaged here. Generally, without being limited to the illustrated exemplary embodiment, such a bond may be provided by injection molding one of the plastic parts 3, 5 onto the other one.

For example polycarbonate or PMMA can be used as a material for the transparent plastic part 3. Polycarbonate or PMMA are also suitable for the opaque plastic part, with a suitable light-blocking additive in this case. Also possible for the part 5 is thermoplastic polyurethane or silicone. These materials usually have a lower Shore hardness than polycarbonate. Such a lower Shore A hardness is furthermore advantageous for attenuating noise that may be produced by vibrations of the ferrule in a receptacle. This may in particular become relevant when the invention is used for illuminating interiors of vehicles, where vibrations are transferred to the light guide or the associated plug.

Ferrule 1 has a channel 7 for accommodating the end of a light guide. Channel 7 extends starting from a rear insertion opening 70 for the light guide towards a light entry end 30 which is formed on the transparent plastic part 3. Channel 7 passes through the opaque plastic part 5, and a portion 71 of channel 7 extends in the transparent plastic part 3.

Without being limited to the specific embodiments illustrated in the figures, a ferrule 1 according to the invention is preferably used for light guides with diameters in a range from 0.2 mm to 5 mm, preferably from 0.35 to 3.5 millimeters. Accordingly, channel 7 has a minimum diameter in a range from 0.25 mm to 5.5 mm, in particular in a range from 0.4 to 4 millimeters. If, for example, instead of a fiber bundle a single fiber is used as the light guide, in particular a thicker one, the diameter of the channel may even be smaller. In this case, channel 7 may have a diameter of 0.1 millimeters or more. For the purposes of the invention, the term light guide also refers to an arrangement of one or more light-guiding fibers in a tubing that is provided at least along portions thereof. In this case, the diameter of the light guide is given by the diameter of the tubing within the range of the tubing.

If one or more of the aforementioned elements (channel, collar, light guide) are not round, the diameter of the element is understood to be the diameter of the respective largest possible inscribable circle. If the channel approximately has a square cross section, this diameter corresponds to the diameter of the inscribed circle, that is to say the largest possible circle which only touches the wall of the channel.

According to a preferred embodiment of the invention, which is also implemented in the example of FIG. 1, the channel 7 may be formed as a blind hole. Accordingly, channel 7 ends in the transparent plastic part 3 and is closed at one end thereof. In this way, a light entry surface 31 can be formed on the transparent plastic part 3, in particular at the light entry end 30 thereof, which may easily be formed during injection molding when the plastic part 3 is produced. Moreover, the fiber ends are protected in this way.

As can be seen in FIG. 1, the two plastic parts 3, 5 overlap axially with respect to the channel 7 along a longitudinal portion 10. This is favorable to firmly join the two elements to each other. Generally, it is particularly favorable in this case if the two plastic parts 3, 5 overlap axially with respect to the channel 7 along the longitudinal portion 10 such that the opaque plastic part 5 surrounds the transparent plastic part 3. In this way, stray light which emerges laterally from the transparent plastic part 3 can be blocked by the opaque plastic part 5 within the range of the overlap.

The opaque plastic part 5 furthermore has a collar 50 surrounding the channel 7 and having an outer diameter that is greater than the maximum outer diameter of the transparent plastic part 3. This collar 50 which is effective as a light-blocking skirt blocks light exiting obliquely from the transparent plastic part 3 towards the light guide on the one hand, and on the other hand also light which is scattered on surrounding parts in the injection area in the direction along the light guide.

According to one embodiment of the invention, as in the illustrated example, the end of the ferrule 1 opposite the light entry end 30 may be defined by a tubular portion 17, such that the collar 50 is arranged between the light entry end 30 and the tubular portion 17, wherein the channel 7 extends through the tubular portion, or the tubular portion 17 defines part of the channel 7. This tubular portion fulfills two advantageous tasks. On the one hand, this portion is capable of at least partially blocking light which enters the channel 7 next to the light guide. On the other hand, the tubular portion may be used as a sleeve for fitting a piece of tubing thereon and on the light guide. This tubing may in turn serve as a further measure for blocking light that got into the channel 7, and can also mechanically stabilize the assembly as a kink protection.

Figure 2:
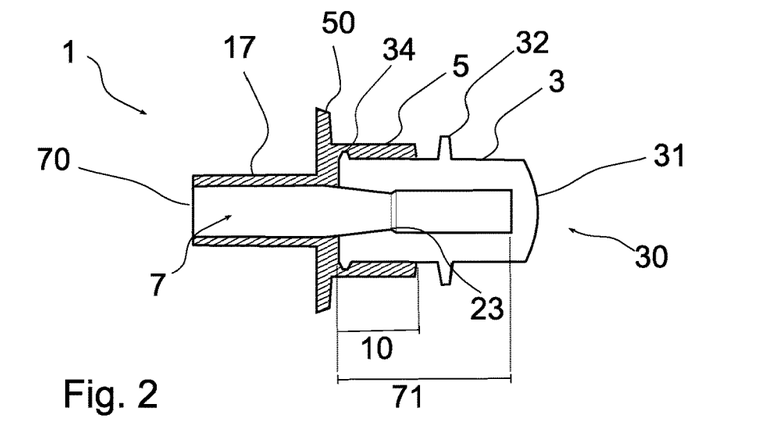
FIG. 2 shows a variation of the embodiment of FIG. 1, with a form-fitting connection of the plastic parts.

FIG. 2 shows a variation of the embodiment illustrated in FIG. 1. In this variation, the two plastic parts 3, 5 are connected to each other by a form-fitting connection. For this purpose, the transparent plastic part 3 has an annular formation 34. Upon overmolding of the opaque plastic part 5, a corresponding complementary shape is then produced in the latter, thereby achieving the form-fit with the formation 34. In addition to the form-fitting connection, a material bond is produced by the overmolding on the other hand. It will be apparent to those skilled in the art that the annular formation 34 is only one example of a feature for producing a form-fitting interengagement. More generally, it is advantageous in any case that one of the plastic parts 3, 5 is shaped so that a form-fitting connection is produced between the two parts 3, 5 when the other plastic part is injection molded thereto.

The position of the collar 50 can be adapted to the respective requirements. In the example shown in FIG. 1, the collar 50 is arranged within the range of the longitudinal portion 10 within which the two plastic parts 3, 5 overlap. In the example of FIG. 2, by contrast, the collar is provided behind this longitudinal portion 10, as seen from the light entry end 30.

Moreover, in the example of FIG. 2 the transparent plastic part 3 also has a collar 32, which however has a diameter that is smaller than the diameter of the collar 50. A collar 32 on the transparent plastic part 3 may generally serve to center the latter in a guide and/or to achieve a twist protection by features provided on the collar 32.

In order to anchor the end of a light guide to the channel wall in the ferrule 1, a plastic compound or synthetic resin, which is preferably transparent in the cured state, can be introduced into the channel 7 so as to surround the light guide. More generally, without being limited to the specific exemplary embodiments illustrated, an anchoring feature 22 formed in the plastic material of the ferrule may be provided in the channel 7, which is suitable to provide a form-fitting connection with a synthetic resin filled into and cured within the channel. Preferably, the anchoring feature 22 is formed in the transparent plastic part 3. The synthetic resin may likewise comprise a silicone.

The light entry surface 31 may be shaped according to the respective requirements. In the example of FIG. 1, this surface is planar, while in the example of FIG. 2 it defines a convex refractive surface.

A preferred embodiment of an anchoring feature 22 is an annular undercut 23 in the channel 7. The undercut 23 may advantageously be formed so as to provide for reliable anchoring on the one hand, but on the other hand also allows to use a one-piece mandrel in the injection molding tool. Preferably, a ratio of the diameter of the channel to the change in diameter at the undercut is at least 3, in order to allow for retraction of the mandrel of the injection molding tool forming the channel 7. The diameter of the channel is understood to be the minimum diameter before the undercut 23, here. In order to achieve good anchoring, on the other hand, this ratio is preferably not more than 10. Another measure to facilitate removal of the mandrel is an undercut tapering in the direction from the light entry end 30 to the insertion opening 70.

With the ratios mentioned above, the change in diameter at the undercut 23 has typical dimensions between 0.3 millimeters and 0.7 millimeters for larger channel diameters. To give an example, a diameter change of 0.3 millimeters is suitable for a light guide having a diameter of 1 millimeter.

Figure 3:
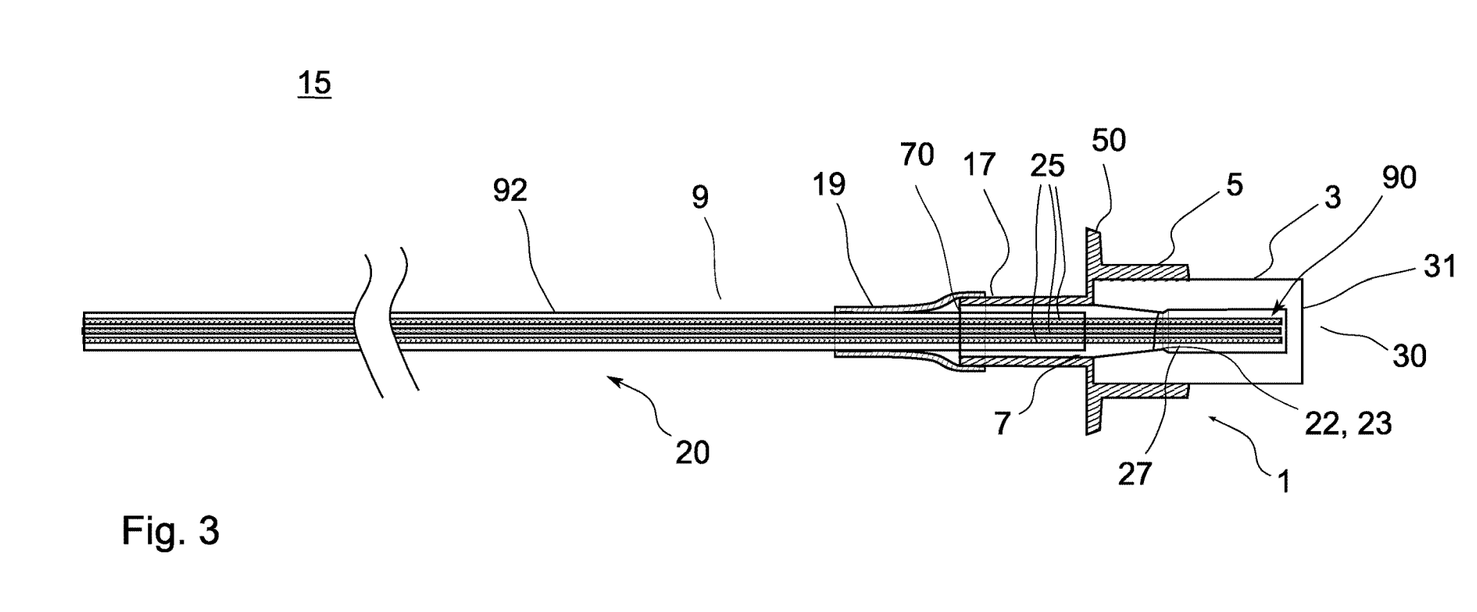
FIG. 3 shows a lighting assembly with a ferrule.

FIG. 3 shows a lighting assembly 15 with a light guide 9. Light guide 9 is terminated at one end 90 with a ferrule 1 according to the invention. Light guide 9 is a side-emitting light guide, so that light which is injected at the end 90 of light guide 9 is continuously scattered out along a lighting portion 20. The lighting portion 20 is defined in particular by the portion protruding from the ferrule 1. Such a lighting portion may be used for a linear light source, which is employed for decorative lighting such as highlighting of contours, for example.

As illustrated in the example of FIG. 3, the end 90 of light guide 9 is preferably potted in a synthetic resin 27 in channel 7 and is thereby fixed. According to a particularly preferred embodiment of the invention, a photocuring, preferably UV-curing resin is used. This resin can then be cured by being irradiated with light of a suitable wavelength through the transparent plastic part 3.

Generally, it is particularly preferred that a light guide is used which comprises a plurality of light-guiding fibers, in particular again side-emitting fibers, which run side by side. This allows to make the light guide particularly flexible. The embodiment shown in FIG. 3 also includes a plurality of light-guiding fibers 25. Due to the fixing in the channel 7 by means of the transparent synthetic resin 27, good light injection into the plurality of fibers 25 can be achieved. However, in particular in such a light guide 9 the problem arises that more stray light is produced, since light injected at the light injection end 30 is partly also getting in between the fibers and is then not guided within the fibers 25. Here, the two-part ferrule of the invention overcomes this problem by suppressing disturbing light leakage at the plug where the ferrule 1 with the light guide 9 is plugged.

According to one embodiment of the invention it is suggested to choose the diameter of the channel greater than the outer diameter of the light guide 9 in sections thereof, at least at the rear end of the ferrule 1 opposite the light entry end 30, in order to facilitate the insertion of the light guide 9 into the ferrule 1. This is also the case in the embodiment of FIG. 3, in which the light guide 9 comprises a transparent jacket 90 having an outer diameter that is smaller than the inner diameter of the surrounding wall of channel 7. However, it should be noted here that in this case stray light from the light entry end 30 might propagate along the gap to reach the rear end and emerge between the ferrule 1 and the light guide 9.

The tubular portion 17 opposite the light entry end 30 imparts several advantageous properties to the ferrule 1 and hence to the lighting assembly 15 produced therewith. Due to the extension of channel 7 along the tubular portion 17, the light guide 9 is stabilized laterally, which in particular reduces stress on the bond with the resin 27 mechanically. Also, the aforementioned stray light is reduced due to the extension of channel 7. Finally, the tubular portion 17 may serve as a fitting or fastening element for a piece of tubing fitted on the light guide 9. More generally, therefore, a refinement of the invention is contemplated, in which a piece of tubing 19 surrounds the tubular portion 17 and the light guide 9 protruding from the ferrule 1 at the tubular portion 17. The piece of tubing 19 provides additional lateral stabilization, in particular as a kink protection for the light guide 9. In particular, however, the piece of tubing blocks the stray light mentioned above, which propagates along the channel 7 next to the light guide. Therefore, preferably, an opaque material is used for the piece of tubing. Among others, a heat-shrinkable tube is suitable, which shrinks when subjected to heat thereby creating a firm connection. Also possible is an elastomer tube that has a suitable diameter to conform to both the light guide and the tubular portion.

In order to produce a ferrule 1 according to the invention, a method according to the above description is provided in which a transparent plastic part 3 and an opaque light blocking plastic part 5 are each produced by injection molding, wherein the making of one of the two plastic parts 3, 5 comprises injection molding this plastic part 3, 5 onto the other plastic part 3, 5 that has been made previously, so that the two plastic parts 3, 5 are connected to each other, and wherein during injection molding a mandrel is used for producing a channel, so that a ferrule 1 is obtained in which the transparent plastic part 3 has a light entry end 30 and the ferrule 1 has a channel 7 extending towards the light entry end 30, wherein at least a portion 71 of the channel 7 extends in the transparent plastic part 3, wherein the injection molding is performed such that the two plastic parts 3, 5 overlap axially with respect to the channel 7 along a longitudinal portion 10, and wherein during injection molding of the opaque plastic part 5, a collar 50 is formed thereon which surrounds the channel 7 and which has an outer diameter that is greater than the maximum outer diameter of the transparent plastic part 3.

A lighting assembly 15 as illustrated in FIG. 3, by way of example, may be obtained according to an embodiment of the aforementioned method by anchoring a light guide 9 in a portion 71 of the channel 7 extending in the transparent plastic part 3 using a transparent synthetic resin, wherein the anchoring is preferably accomplished as already described above by filling in the liquid synthetic resin and inserting the end 90 of the light guide 9 into the channel 7 and irradiating light onto the transparent plastic part, thereby curing the photocuring resin.

Preferably, in this case, the ferrule 1 is first prefabricated, and then the light guide 9 is anchored using the resin 27. According to a variation it is also possible to first produce the transparent plastic part 3 by injection molding, then to bond the light guide 9 to the transparent plastic part 3, in particular by anchoring it using a synthetic resin as described above, and then to injection mold thereon the opaque plastic part 5 by placing the light guide 9 together with the transparent plastic part 3 in the injection molding tool and overmolding the light guide 9 with an opaque plastic material so as to form the opaque plastic part 5. In this case, there will usually be no gap anymore between the channel 7 and the light guide 9, since the portion of the channel 7 extending through the opaque plastic part 5 is produced by the overmolding in contact with the light guide 9.

According to yet another variation it is likewise possible to produce the transparent plastic part 3 by placing the light guide 9 in the injection molding tool and directly injection molding the plastic part 3 onto the light guide 9. The opaque plastic part 5 can then be injection molded as described above, also with inserted light guide 9, onto the light guide and the transparent plastic part 3. Accordingly, it is contemplated according to one embodiment of the invention, that the transparent plastic part 3 is bonded to the end 90 of a light guide 9 placed in an injection molding tool during the injection molding, and that subsequently the opaque plastic part 5 is injection molded onto the transparent plastic part.

It will be apparent to those skilled in the art that the invention is not limited to the specific exemplary embodiments illustrated, but may rather be varied within the scope of the specification and the claims. The embodiments that have been described individually may as well be combined with each other. For example, the embodiments only show a single collar. An embodiment in which two or more axially spaced collars are provided to achieve particularly good light blocking is likewise possible. Furthermore, the embodiments show channels in the form of blind holes having one open end. However, the channel 7 may as well extend through the ferrule 1 and accordingly be open towards the light entry end. A suitable light entry surface may then be provided by the synthetic resin 27 in the channel 7.

Figure 4:
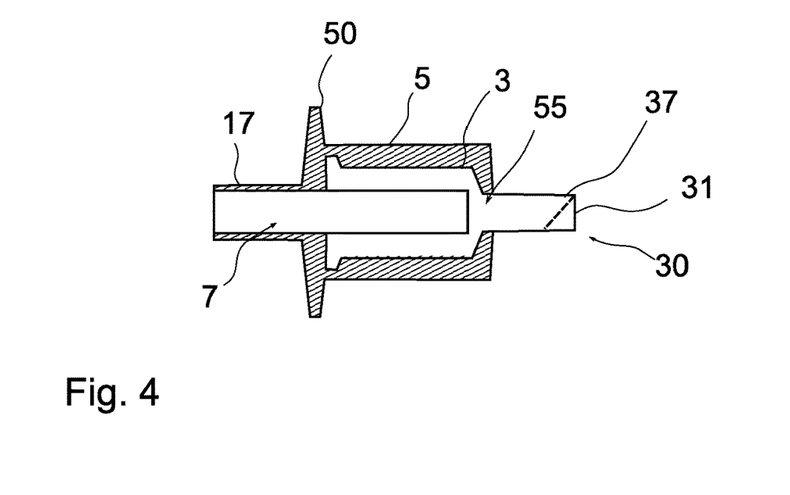
FIG. 4 shows a further variation of a ferrule.

Also, the channel 7 does not necessarily need to end in front of the opaque plastic part 5 on the light entry side. Rather, the opaque plastic part 5 may as well cover a majority of the transparent plastic part 3 and extend beyond the end of the one-sided open channel 7. Such a variation is shown in FIG. 4. As can be seen, this example is based on the fact that towards the light entry end 30 of the ferrule 1, the opaque plastic part 5 extends beyond the end of the one-sided open channel 7. In this case, the minimum diameter of the light entry side opening 55 of the plastic part resulting from the overmolding of the transparent plastic part 3 may optionally even be smaller than the diameter of the channel 7.

According to a further aspect of the invention, which is also implemented in the example of FIG. 4, the light entry end of the ferrule 1 may advantageously be formed as a light guiding portion. Light guiding portion 37 is provided by an extension of the transparent plastic part 3 extending coaxially to the channel 7. The diameter or, more generally, the width of the light guiding portion 37 is preferably smaller than its length. The end face of the light guiding portion defines the light entry surface 31 of the transparent plastic part 3.

Unlike illustrated, the light entry surface 31 may as well be inclined relative to the longitudinal extension of the light guide 9, which is very advantageous for light injection in certain configurations. Such an inclination is indicated in FIG. 4 by the oblique line at the light entry end 30. The light guiding portion may be useful, inter alia, to achieve homogenization of the injected light before entering the light-guiding fibers 25. Such homogenization is for instance advantageous when differently colored lighting elements are to be used for lighting, such as spatially separated light-emitting diodes or laser diodes of different colors.

Figure 5:
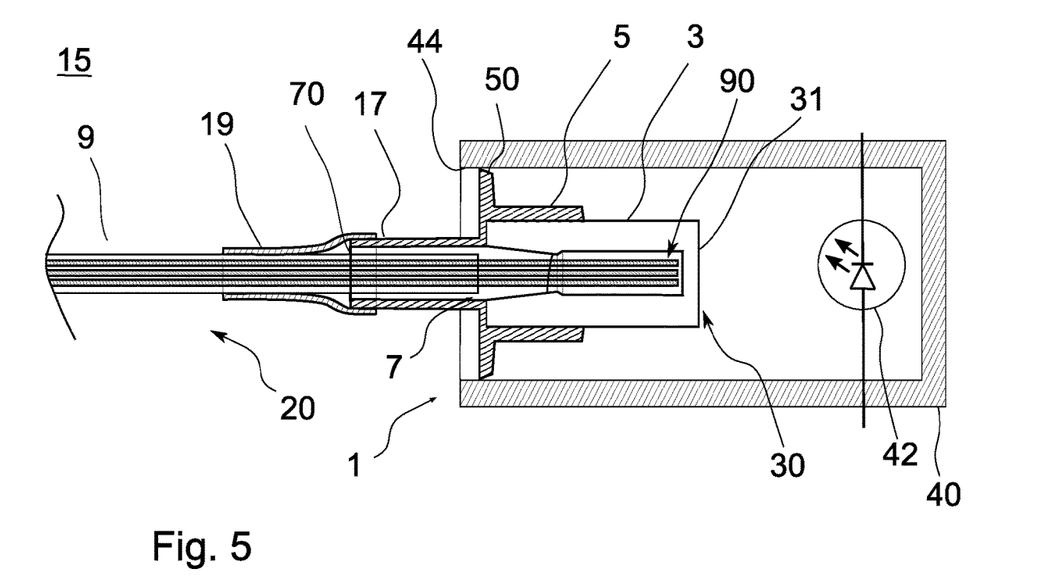
FIG. 5 shows a lighting assembly with a ferrule inserted in a housing.

FIG. 5 schematically shows a further embodiment of a lighting assembly 15. This embodiment generally additionally comprises a light source 42 in a housing 40. Housing 40 has an opening 44 in which the ferrule 1 with light guide 9 is fitted. Light source 42 preferably comprises a light emitting diode, as shown, or, more preferably, an array of a plurality of light emitting diodes. Collar 50 and opening 44 may generally be adapted to each other such that the collar 50 seals the opening 44 in a light-tight manner, so that when the ferrule 1 is installed, the light from light source 42 cannot leak to the outside at the opening 44. In order to achieve such a light-tight sealing, it may be contemplated according to one embodiment that the opaque plastic part 5 and hence also the collar 50 is made of a supple, i.e. flexible, in particular elastomeric material. A suitable material is thermoplastic polyurethane, for example, or, more generally, a thermoplastic elastomer.

Figure 6:
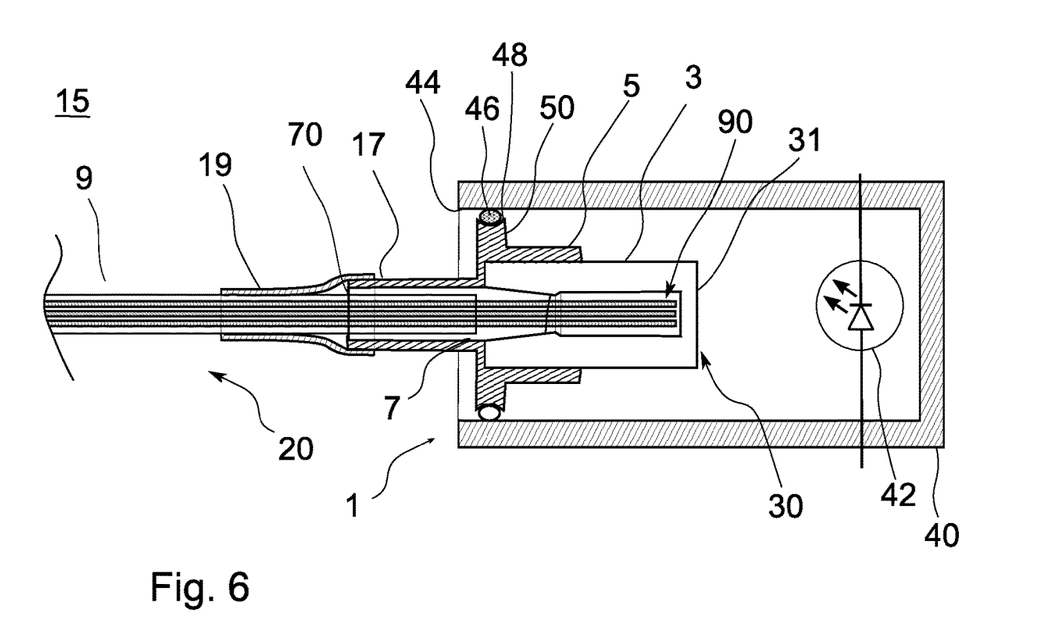
FIGS. 6 to 8 show variations of the lighting assembly illustrated in FIG. 5.
Figure 7:
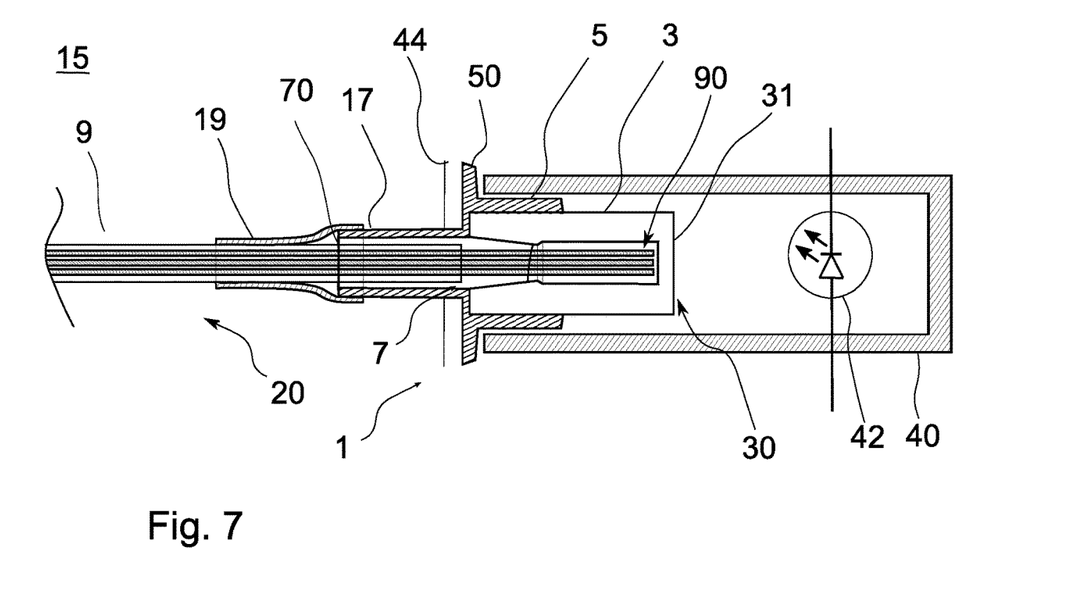
Figure 8:
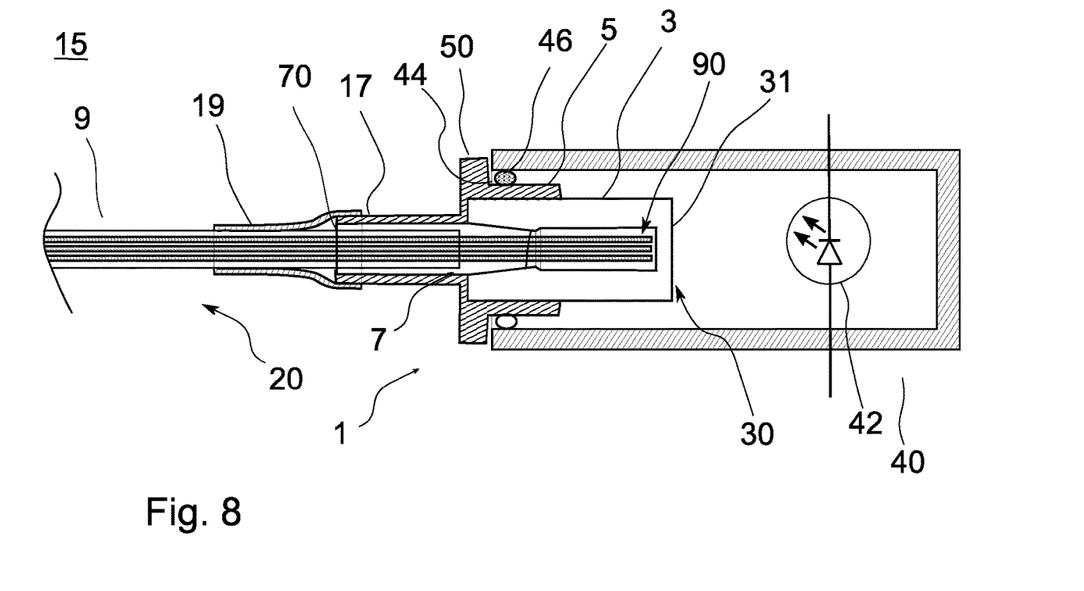

FIGS. 6 to 8 show alternative or additional embodiments. These embodiments also comprise a light-tight sealing between the collar 50 of opaque plastic part 5 and the opening 44. According to FIG. 6, an O-ring or sealing ring 46 is provided for sealing. Sealing ring 46 is preferably secured to the collar, as illustrated. For this purpose, an annular groove 48 may be provided in the collar 50, for example.

In the exemplary embodiments of FIGS. 5 and 6, the collar 50 of ferrule 1 is fitted within the opening 44 of housing 40. The variations of FIGS. 7 and 8, by contrast, are based on the design principle that the collar 50 rests on the opening 44 like a cover or protrudes beyond the opening 44 covering the opening 44. In the variation according to FIG. 8, a sealing ring 46 is provided, similar to the example of FIG. 6. In the assembled state, the sealing ring is arranged in the channel 7 and thus in front of collar 50. Even though the sealing ring 46 seals the opening 44, the collar 50 is advantageous. For example, the ring might not engage on the ferrule 1 and on the inner wall of housing 40 consistently all along the entire circumference, due to manufacturing tolerances, so that light might still escape. Also, the contact area of the ring on the walls is narrow, so that light might still pass the ring through the plastic material, which would then be visible at the opening 44.

Figure 9:
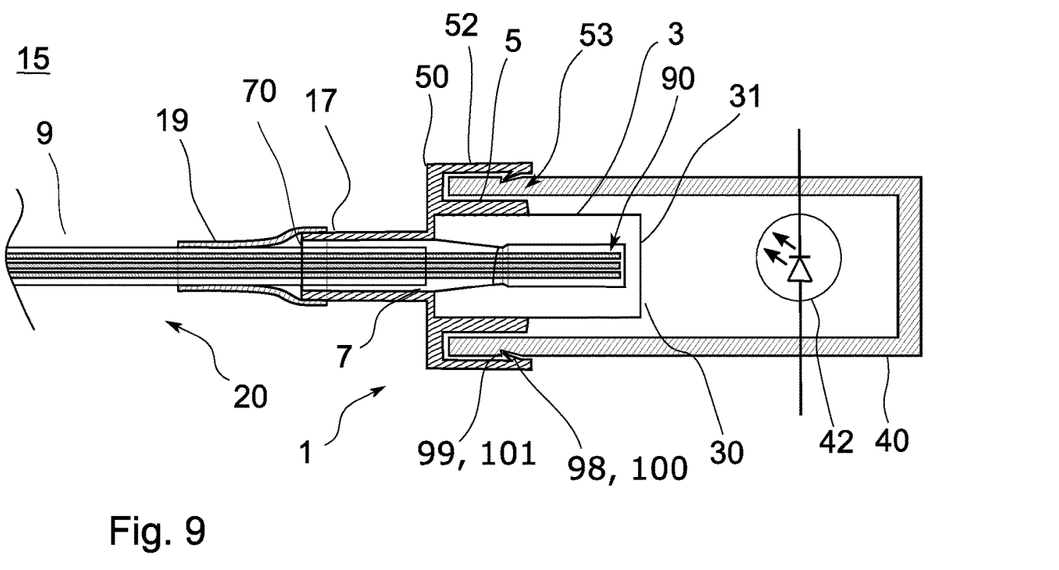
FIGS. 9 and 10 show another variation of the lighting assembly illustrated in FIG. 5.
Figure 10:
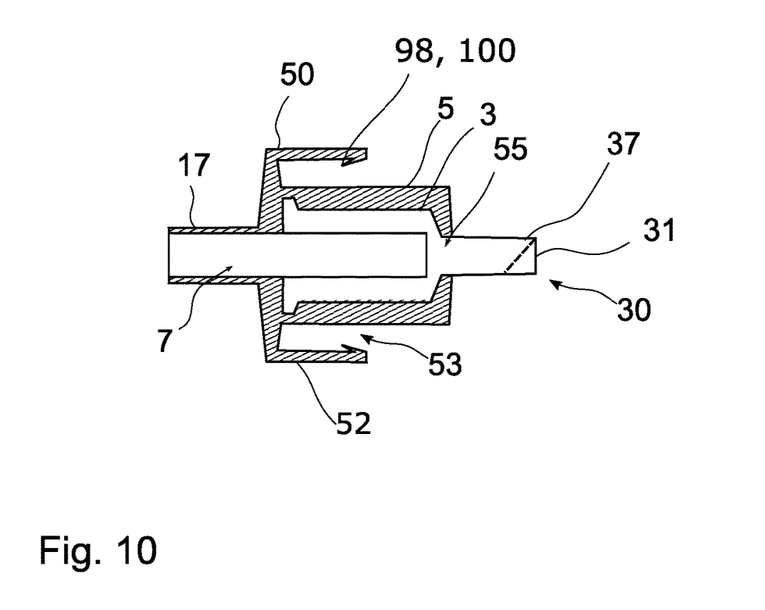

FIGS. 9 and 10 show still another alternative embodiment that comprises a light-tight sealing between the collar 50 of opaque plastic part 5 and the opening 44. According to FIGS. 9 and 10, collar 50 of the opaque plastic part 5 further includes an outer portion 52 that surrounds housing 40. Outer portion 52 can be effective as a light-blocking portion that further blocks light exiting from the transparent plastic part 3 on the one hand and on the other hand also light which is scattered on surrounding parts in the injection area.

The variation of FIGS. 9 and 10 is based on the design principle that the outer portion 52 is connected to an outer wall 53 of housing 40. For example, outer wall 53 includes recesses 99, 101 that are engaged by protrusions 98, 100, respectively, to connect the two plastic parts 3, 5 to each other.

The lighting assembly 15 with one or more side-emitting fibers is particularly preferably used for accent lighting of vehicles, in particular automobiles, aircraft, ships, and/or trains. In this case, the fiber bundle can be installed at any desired locations or in contours. When light is injected into the fiber bundle, the latter preferably appears as a light-emitting band or light-emitting line along these contours. Such illuminated contours may be inside, but also outside of the vehicle.

A preferred installation location of a lighting assembly 15 according to the invention in automobiles may be, for example, an interior lining of a door, where the contour of the recesses of the door opener, armrest, transitions in the lining material, etc., can be highlighted in this way. In airplanes and ships, installation thereof along the aligned windows, hand luggage compartments, etc. is conceivable. In aircraft and ships, the fiber bundle according to the invention may advantageously be used for marking escape routes.

The lighting assembly 15 may also be used for accent lighting of interiors and/or facades in architecture. In this case, the light guide 9 is preferably installed along contours of interior components such as passages, support elements, outlines of buildings, etc., and is connected to suitable light sources. In this manner it is possible to reproduce the contours of a building or parts of buildings using the light guide 9 with side-emitting fibers, and to realize a linear light source.

Also suitable is the use of the lighting assembly 15 as part of furniture, in particular seating furniture, car seats, living spaces, and/or kitchens. If the light guide is, for example, incorporated in the seams of seating furniture such as armchairs, sofas, chairs, etc., the contours of this furniture can be accentuated with the light guide 9 as a light-emitting strip when illuminated. When integrated into shelves or cabinets, entire living spaces can be designed with selective light effects in this way.

Especially in the automotive industry, headlamps are increasingly being used to produce a recognition value of the manufacturer by special lighting measures. Therefore, some automobile headlamps have parking light rings surrounding the dipped beam and, when the light is switched on, appear as a largely homogeneously illuminated ring. Other manufacturers use a strip of LEDs in their headlamps, for example. The lighting assembly 15 may also be used for this purpose in headlights, in particular in headlights of vehicles of all kinds, particularly preferably in headlights of automobiles. The lighting assembly 15 makes it possible to create any desired preferably homogeneously light-emitting patterns in headlamps. The ferrule 1 of the invention prevents, in a simple way, the light injection site from being visible. Unlike LEDs arranged in strips, for example, this use according to the invention has the advantage that a few LEDs are sufficient to provide the illumination. Moreover, in contrast to a strip of LEDs, no individual points of light are visible, which may be preferred for design reasons. Within the scope of the use according to the invention, the functionality as a position light within headlights is possible, which may include applications as a parking light and as a daytime running light, for example.

A further preferred use of the fiber bundle according to the invention is the illumination of external contours of vehicles, in particular of automobiles, aircraft, ships, and/or trains. This contour lighting may optionally replace or supplement the prescribed position lights in the relevant vehicles and thus contribute to traffic safety.

It is also possible to use a lighting assembly 15 for illuminating runways for aircraft, for example airplanes, helicopters, airships. So far, runways are illuminated by a multitude of incandescent lamps aligned in a row, which have a limited lifetime, which is why the failed lamps in such a row have to be replaced again and again during operation of the airport. If the fiber bundle according to the invention is arranged along the runways and/or along a center line thereof, a linear luminous pattern is created which marks the position of the runway in the dark and/or under low visibility conditions. The light source can inject the light into the light guide 9 at a few central points. The lighting assembly according to the invention itself is largely maintenance-free, so that maintenance of such runway lighting is limited to the few light sources that are employed. In this way, it is possible to mark the takeoff and landing runways of airports, for example, but also those of aircraft carriers, helipads, and for other aircraft.

Another application of the lighting assembly is generally two-dimensional lighting. The light guide is laid around a transparent element. The light guide 9 then injects the laterally emitted light into the transparent element which in turn emits the light through its faces. For example, a backlight of a display can be produced in this way. In this case, the ferrule prevents inhomogeneous light emission of the transparent element around the point of injection into the light guide. Displays illuminated in this way may include display devices of all types, but preferably flat panel displays, such as computer monitors, flat panel television sets, and displays of mobile phones and tablet computers. A most homogeneous possible illumination of the display surface is desired, which is why a diffuser plate is usually disposed between fluorescent tubes and the display surface. According to one application, such a diffuser plate can be used as a transparent element in combination with a lighting device 15 laid around this plate.

Other possible two-dimensional lighting devices are light tiles, for example in the form of so-called ground lights.

LIST OF REFERENCE NUMERALS

1 Ferrule
3 Transparent plastic part
5 Opaque plastic part
7 Channel
9 Light guide
10 Longitudinal portion of 1
15 Lighting assembly
17 Tubular portion of 1
19 Piece of tubing
20 Lighting portion of 9
22 Anchoring feature
23 Annular undercut
25 Light-guiding fiber
27 Synthetic resin
30 Light entry end
31 Light entry surface
32 Collar of 3
34 Annular formation of 3
37 Light guiding portion
40 Housing
42 Light source
44 Opening in 40
46 Sealing ring
48 Annular groove
50 Collar of 5
52 Outer portion of collar 50
53 Outer wall of housing 40
55 Light entry side opening of 5
70 Insertion opening
71 Portion of channel 7 extending in plastic part 3
90 End of light guide 9
92 Jacket
98, 100 Protrusions of outer portion 52
99, 101 Recesses of outer wall 54

What is claimed is:
1. A ferrule for terminating a light guide, comprising:
a transparent plastic part having a light entry end that is configured to receive an end of the light guide;
an opaque light-blocking plastic part connected to the transparent plastic part; and
a channel extending through the transparent plastic and opaque light-blocking plastic parts, wherein the opaque plastic part has a collar that surrounds the channel and has an outer diameter that is greater than a maximum outer diameter of the transparent plastic part.
2. The ferrule of claim 1, wherein the transparent plastic and opaque light-blocking plastic parts overlap axially with respect to the channel along a longitudinal portion such that the opaque plastic part surrounds the transparent plastic part.

3. The ferrule of claim 1, wherein the transparent plastic and opaque light-blocking plastic parts are connected to each other by a material bond.

4. The ferrule of claim 1, wherein one of the transparent plastic and opaque light-blocking plastic parts is injection-molded on the other of the transparent plastic and opaque light-blocking plastic parts.

5. The ferrule of claim 1, wherein the channel has a closed end in the transparent plastic part, and wherein the transparent plastic part has a light entry surface at the light entry end.

6. The ferrule of claim 1, wherein the channel extends through a tubular portion at an end opposite the light entry end, where the collar is arranged between the light entry end and the tubular portion.

7. The ferrule of claim 1, wherein the channel has a minimum diameter in a range from 0.4 to 4 millimeters.

8. The ferrule of claim 1, wherein the opaque plastic part extends beyond an end of channel.

9. A ferrule for terminating a light guide, comprising:
a transparent plastic part having a light entry end that is configured to receive an end of the light guide;
an opaque light-blocking plastic part connected to the transparent plastic part;
a channel extending through the transparent plastic and opaque light-blocking plastic parts, wherein the opaque plastic part has a collar that surrounds the channel and has an outer diameter that is greater than a maximum outer diameter of the transparent plastic part; and
an anchoring feature formed in the channel and a plastic compound filled into and cured within the channel to provide a form-fitting connection with the anchoring feature.

10. The ferrule of claim 9, wherein the anchoring feature comprises an annular undercut, wherein the channel has a first diameter and the annular undercut has a second diameter.

11. The ferrule of claim 10, further comprising a ratio of the first diameter to the second diameter is in a range from 3 to 10.

12. A lighting assembly, comprising:
a side-emitting light guide so that light injected at one end in the operating state thereof is continuously scattered out along a lighting portion that forms a linear light source, the side-emitting light guide having an end; and
a ferrule disposed on the end, the ferrule comprising: a transparent plastic part having a light entry end that is configured to receive end of the light guide; an opaque light-blocking plastic part connected to the transparent plastic part; and a channel extending through the transparent plastic and opaque light-blocking plastic parts, wherein the opaque plastic part has a collar that surrounds the channel and has an outer diameter that is greater than a maximum outer diameter of the transparent plastic part.

13. The lighting assembly of claim 12, further comprising a piece of tubing surrounding a tubular portion of the ferrule, the light guide protruding from the ferrule at the tubular portion.

14. The lighting assembly of claim 12, wherein the end of the light guide is potted and fixed in the channel in a synthetic resin.

15. The lighting assembly of claim 12, wherein the light guide comprises a plurality of light-guiding side-emitting fibers running side by side.

16. A lighting assembly, comprising:
a side-emitting light guide so that light injected at one end in the operating state thereof is continuously scattered out along a lighting portion that forms a linear light source, the side-emitting light guide having an end;
a ferrule disposed on the end, the ferrule comprising: a transparent plastic part having a light entry end that is configured to receive an end of the light guide; an opaque light-blocking plastic part connected to the transparent plastic part; and a channel extending through the transparent plastic and opaque light-blocking plastic parts, wherein the opaque plastic part has a collar that surrounds the channel and has an outer diameter that is greater than a maximum outer diameter of the transparent plastic part; and
a housing with a light source, wherein the housing has an opening in which the ferrule is fitted.

17. The lighting assembly of claim 16, wherein the collar seals the opening in the housing in a light-tight manner.

18. The lighting assembly of claim 16, wherein the collar protrudes beyond the opening to cover the opening.

* * * * *